United States Patent [19]

Williams

[11] Patent Number: 5,017,025
[45] Date of Patent: May 21, 1991

[54] BEARING ASSEMBLY FOR A SHAFT JOURNAL

[75] Inventor: Samuel R. Williams, Canton, Ohio

[73] Assignee: The Timken Company, Canton, Ohio

[21] Appl. No.: 505,147

[22] Filed: Apr. 5, 1990

[51] Int. Cl.[5] ..................... F16C 43/04; F16C 33/78
[52] U.S. Cl. .................................. 384/584; 384/486; 384/571
[58] Field of Search ............... 384/477, 486, 520, 537, 384/542, 556, 559, 560, 571, 584

[56] References Cited

U.S. PATENT DOCUMENTS

| | | | |
|---|---|---|---|
| 2,851,315 | 9/1958 | Zavoda | 384/486 |
| 3,029,082 | 4/1962 | Horger | 277/136 |
| 3,494,682 | 2/1970 | Keller | 384/486 |
| 3,628,837 | 12/1971 | Otto | 384/462 |
| 4,819,949 | 4/1989 | Otto | 277/29 |

FOREIGN PATENT DOCUMENTS

| | | | |
|---|---|---|---|
| 506867 | 10/1954 | Canada | 384/584 |
| 1349340 | 4/1974 | United Kingdom | 384/584 |

Primary Examiner—Thomas R. Hannon
Attorney, Agent, or Firm—Gravely, Lieder & Woodruff

[57] ABSTRACT

A bearing assembly fits over the journal at the end of a shaft and is clamped between a fillet at one end of the journal and an end cap which extends across the opposite end of the journal. The bearing assembly includes a double row tapered roller bearing having a two indirectly mounted cones, a double cup around the cones, and tapered rollers arranged in two rows between the raceways of the cones and cup. The bearing assembly also includes seal rings located against the cones and seals fitted into the end of the cup and cooperating with the seal rings to establish barriers at the ends of the bearings. The outboard seal ring is clamped between the end cap and the outboard cone, whereas the inboard seal ring is clamped between the inboard cone and the backing ring. A slight clearance exists between the inboard seal ring and the journal to prevent fretting beneath that seal ring due to slight flexures in the journal. The inboard seal ring fits into a bore on the fillet ring so the fillet ring maintains the inboard seal ring centered with respect to the axis of rotation.

15 Claims, 1 Drawing Sheet

BEARING ASSEMBLY FOR A SHAFT JOURNAL

BACKGROUND OF THE INVENTOR

This invention relates to a bearing assembly for a shaft journal and more particularly to a bearing assembly that is less likely to produce fretting along the surface of a journal.

The Timken Company manufactures and sells, under the trademark AP, a self-contained, prelubricated, preset and sealed bearing assembly for use at the ends of axles and other shafts. This highly versatile bearing assembly has found widespread use on the journals at the ends of rail car axles, in that it fits easily over these journals and mates with a housing in a truck side frame. It basically consists of a two-row tapered roller bearing, seals fitted to each of the ends of the bearing cup, wear rings inside the seals and against the ends of the bearing cones, and a backing ring at the end of the inboard wear ring. Once the journal of the shaft is machined to a prescribed diameter and provided with a fillet of appropriate contour, the bearing assembly is simply passed over the journal and clamped between the fillet and an end cap with bolts that thread into the end of the journal and turn down against the end cap. U.S. Pat. No. 3,494,682 shows a typical AP bearing assembly fitted over an axle journal and clamped in place with an end cap and bolts.

The wear ring, which the seals embrace to close the ends of the bearing, fit snugly around the journal. Indeed, interference fits exist between the two wear rings and the journal, and consequently they must be pressed onto the journal. In use, a minute amount of movement occurs between the snugly fitted wear rings and the journal, owing to flexure in the axle or shaft, and this movement is most pronounced at the inboard wear ring. The movement produces fretting which in time imparts a groove to the journal and an enlargement of the ring bore. As a consequence, the inboard wear ring works loose and does not remain concentric with respect to the surrounding seal.

The present invention resides in a bearing assembly for use on a journal at the end of an axle or other shaft, and the end of the bearing for this bearing assembly is closed with a seal which bears against a seal ring or sleeve. That ring or sleeve is larger than the shaft, so a slight clearance exists between it and the shaft. The seal ring or sleeve finds its center from a backing ring, which also forms part of the bearing assembly and fits snugly against a shoulder or fillet on the shaft.

DESCRIPTION OF THE DRAWINGS

In the accompanying drawings which form part of the specification and wherein like numerals and letters refer to like parts wherever they occur.

DETAILED DESCRIPTION

Figure 1:
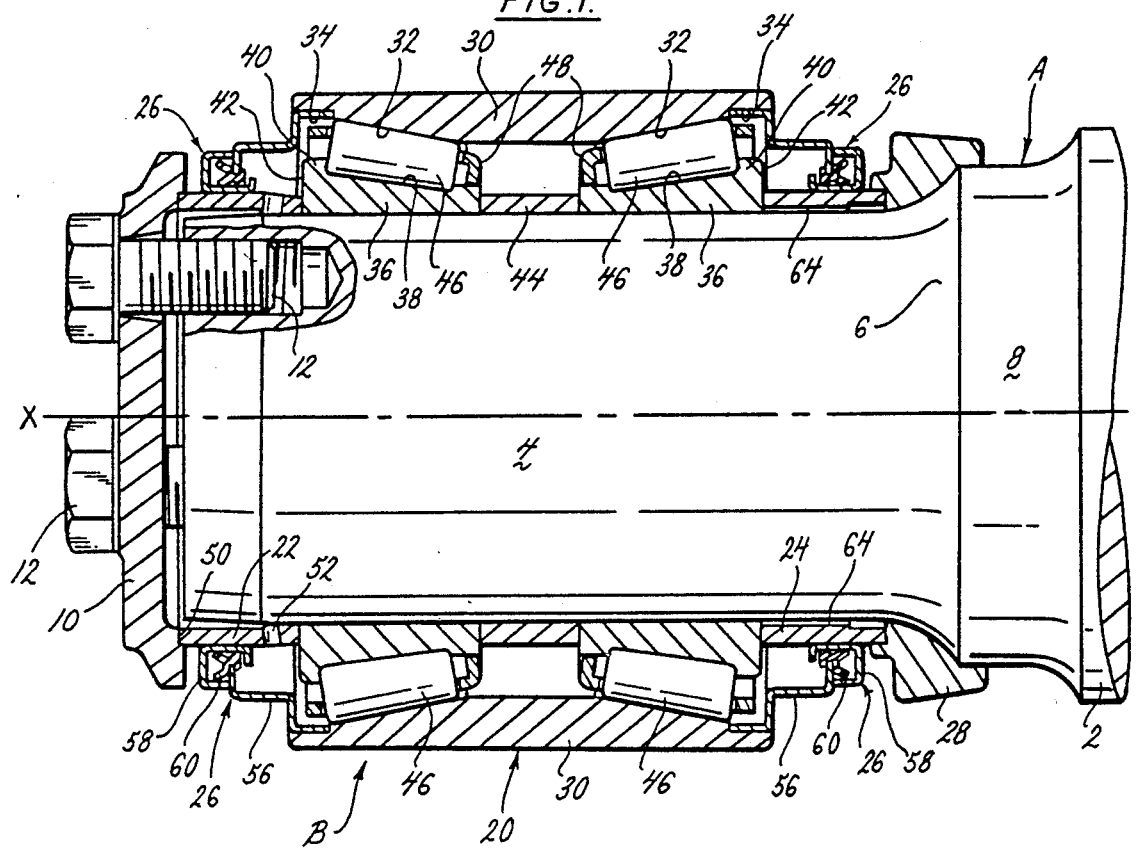
FIG. 1 is a sectional view of a shaft journal fitted with a bearing assembly constructed in accordance with and embodying the present invention.

Referring now to the drawings (FIG. 1), an axle, a mill roll or other shaft A has a main body 2 and a journal 4, at the end of the main body 2. Indeed, the journal 4 forms the very end of the shaft A. It is machined with some precision to a prescribed diameter, which is less than the diameter of the main body 2, and merges into the main body 2 at a fillet 6 which is machined to a prescribed contour. The fillet 6 is in a sense a shoulder, and the main body 2 leads out to that shoulder or fillet 6 along a short cylindrical surface 8. While the diameter of the journal 4 is essentially constant the journal 4 does have a slight taper at its outer end. A bearing assembly B fits over the journal 4 of the shaft A and enables the shaft A to rotate about an axis x, with minimal frictional resistance, relative to a housing or chock in which the bearing assembly B fits. The bearing assembly B is supplied as a pre-lubricated, pre-set and sealed unit, which fits between the fillet 6 of the shaft A and an end cap 10 that extends across and radially beyond the end face of the journal 4. Indeed, the bearing assembly B is clamped between the fillet 6 and the end cap 10 by bolts 12 which thread into the end of the journal 4 and are turned down against the end cap 10.

The bearing assembly B includes (FIG. 1) a double row tapered roller bearing 20 that fits around the journal 4, an outboard seal ring 22 at one end of the bearing 20, an inboard sleeve or seal ring 24 at the other end of the bearing 20, seals 26 which cooperate with the seal rings 22 and 24 to enclose the ends of the bearing 20, and a backing ring 28 beyond the inboard seal ring 24. The bearing 20 is conventional, as is the outboard seal ring 22. The two seals 26 form the subject of U.S. Pat. No. 4,819,949, but other more conventional seals, such as the seal illustrated in U.S. Pat. No. 3,494,682 may be used. The end cap 10 likewise does not possess any novelty. The novelty resides in the inboard seal ring 24 and the backing ring 28 and of course in the overall bearing assembly B which embodies the seal ring 24 and backing ring 28.

Turning now to the bearing 20, it includes (FIG. 1) a double or unitary cup 30 having a pair of raceways 32 which taper downwardly toward the center of the cup 30. The large ends of the raceways 32 open into cylindrical bores 34 which in turn open out of the ends of the cup 30. It is across these ends that the bearing B is confined in a housing, chock or other containing structure. The bearing 20 further includes two separate cones 36, which fit over the journal 4, there being a slight interference fit between the two cones 36 and the journal 4. Each cone 36 has an outwardly presented tapered raceway 38 which lies immediately inwardly from one of the raceways 32 of the cup 30. Each cone 36 further has a thrust rib 40 at the large end of its raceway and a back face 42 at the end of its thrust rib 40. The back faces 42 of the two cones 36 face axially away from the interior of the bearing 20. Between the two cones 36 lies a spacer 44 which maintains a prescribed spacing between the two cones 36, and that spacing determines the setting for the bearing 20. Indeed, the spacer 44 is selected and ground such that it provides the bearing 20 with the desired setting, so the bearing 20 is preset. In that sense the setting, whether it be end play or preload, cannot be varied by the individual who installs the bearing assembly B on the shaft A. In addition, to the double cup 30 and the two cones 36, the bearing 20 includes a row of tapered rollers 46 between each set of cup and cone raceways 32 and 38 and a cage 48 for each row of rollers 46 to maintain the correct spacing between these rollers 46 and to hold the rollers 46 around their respective cones 36 should the cones 36 be withdrawn for the cup 30.

The outboard seal ring 22 fits between the outboard cone 36 of the bearing 20 and the end cap 10. Indeed, its one end abuts the back face 42 of the cone 36, whereas its other end fits into a shallow counterbore 50 formed in the end cap 10. The seal ring 22 is conventional seal wear ring, and as such only that portion of it which is adjacent to the cone 36 fits snugly around the journal 4, there being a slight interference fit between the two. The remainder of the seal ring 22 is separated slightly from the surface of the journal 4 and thereby creates an annular vent cavity which opens into the space between the end face of the journal 4 and the end cap 10.

Figure 2:
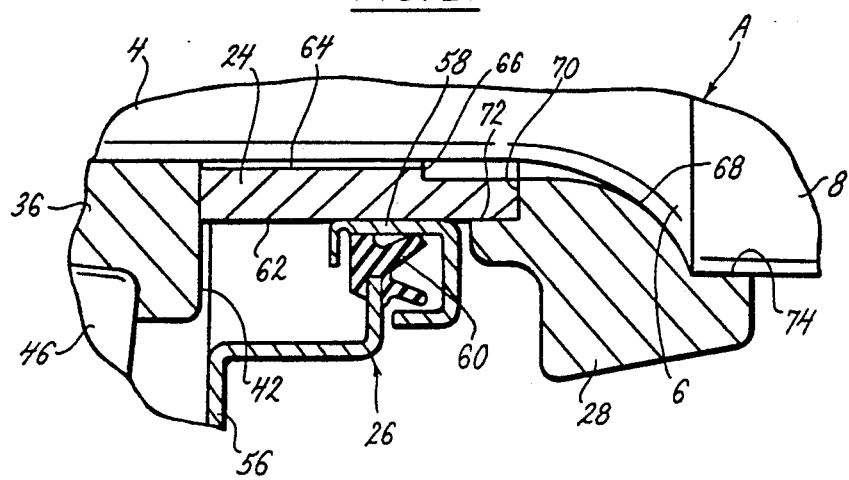
FIG. 2 is a fragmentary, but enlarged, sectional view of the bearing assembly in the region of its inboard seal ring and backing ring.

The outboard seal 26 establishes a barrier between the outboard end of the cup 30 and the outboard seal ring 22 so as to exclude contaminants from the interior of the bearing 20 while retaining a lubricant in that interior. The seal 26 includes a seal case 56 which snaps into the bore 34 at the outboard end of the cup 30 and a shield 58 which fits snugly around the seal ring 22, there being an interference fit between the two. Thus one static barrier exists between the case 56 and the cup 30 and another exists between the shield 58 and the seal ring 22. In addition, the seal 26 has an elastomeric seal element 60 which contacts and otherwise effects a dynamic or live barrier with the shield 58. The seal 26, which is self-venting, is more fully described in U.S. Pat. No. 4,819,949. Other more conventional seals, such as the one depicted in U.S. Pat. No. 3,494,682 may be substituted for the seal 26, but more conventional seals may require vents to equalize the pressure in the interior of the bearing 20 with ambient pressure. The seal of U.S. Pat. No. 3,494,682 has a primary and secondary lips in contact with a wear ring, with the former being urged against the ring by a garter spring In contrast to the conventional outboard seal or wear ring 22, the inboard seal ring 24 does not contact the cylindrical surface of the journal 4. And while it lies concentric to the journal 4, it does not derive its concentricity directly from the journal 4, but instead from backing ring 28 which fits around and against the fillet 6 at the end of the journal 4. The inboard seal ring 24 has a cylindrical outer surface 62 of constant diameter and an inside face 64 which is interrupted with a shoulder 66 that is presented toward the fillet 6 and main body 2 (FIG. 2). A slight clearance exists between the stepped inner surface 64 of the ring 24 and the cylindrical surface of the journal 4. Nowhere does the ring 24 actually contact the journal 4.

The inboard seal 26 is identical to the outboard seal 26. As such, it includes a seal case 56 that snaps into the bore 34 at the inboard end of the cup 30 and a shield 58 which fits around the inboard seal ring 24, as well as an elastomeric seal element 60 which is bonded to the case 56 and cooperates with the shield 58 to establish a dynamic or live barrier along shield 58. An interference fit exists between the shield 58 and the inboard seal ring 24, and thus a static barrier exists along the outer surface 62 of the seal ring 24. Another static barrier exists at the bore 34 in the inboard end of the cup 30 where the seal case 36 snaps into the cup 30. Again a more conventional seal may be substituted for the inboard seal 26.

One end of the inboard seal ring 24 abuts the back face 42 of the inboard cone 36, while the other end projects into and is held by the backing ring 28 so as to remain concentric to, yet spaced outwardly from the journal 4. Thus, a slight clearance exists between seal ring 24 and the cylindrical surface of the journal 4, with that clearance being greatest beyond the shoulder 66.

The backing ring 28 lies primarily around the fillet 6 and indeed includes (FIG. 2) a contoured surface 68, toroidal in configuration, which abuts and matches the contour of the fillet 6, yet does not extend inwardly to the merger of the fillet 6 with the cylindrical surface of the journal 4. Indeed, the contoured surface 68, at its smaller end opens through a shoulder 70 into a shallow bore 72 that receives the end of the inboard seal ring 24. An interference fit exists between the surface of the bore 72 and the cylindrical outer surface 62 of the seal ring 24, so that the ring 24 must be pressed into the shallow bore 72 and is so pressed until its end face abuts the shoulder 70 at the end of the shallow bore 72. As a result, the backing ring 28 centers the inboard seal ring 24 with respect to the axis x, and this maintains it concentric to the cylindrical surface of the journal 4, notwithstanding the slight clearance between the surface of the journal 4 and the inner surface 64 of the seal ring 24. The large end of the contoured surface 68 opens into another bore 74 that snugly receives the cylindrical surface 8 on the main body 2 of the shaft A.

The bearing assembly; B is to a large measure unitized, at least for handling purposes, by the two seals 26. In this regard, the seal cases 56 interlock with the ends of the double cup 30 at the bores 34 in that cup, whereas a snug friction fit exists between the shield 58 and their respective seal rings 22 and 24. The shields 58 furthermore capture the elastomeric seal elements 60 which are bonded to the seal cases 56. As a consequence, the two seal rings 22 and 24 remain at the ends of the cones 36 and prevent the cones 36 and their respective tapered rollers 46 from being withdrawn from the cup 30. The spacer 44 is, of course, captured between the two cones 36. The, backing ring 28 having been pressed over the inboard seal ring 24, remains with that ring as part of the unitized bearing assembly B.

To install the bearing assembly B on the shaft A, the end of the shaft A is first machined to provide it with a journal 4 of the correct diameter and length and with a fillet 6 of the proper contour, as well as with a short cylindrical surface 8 having the appropriate diameter. Of course, the cylindrical surface of the journal 4, the fillet 6 and the surface 8 all have a common center, that being the axis x. With the journal 4, fillet 6 and cylindrical surface 8 so prepared, the bearing assembly B is forced as a unit over the journal 4 with the backing ring 28 leading. Being larger than the journal 4, the backing ring 28 and inboard seal ring 24 fit easily over the journal 4. However, once the inboard cone 36 encounters the journal 4, an axially direct force is applied to the outboard seal ring 22, and this force has a magnitude great enough to overcome the interference between the two cones 36 and the journal 4. As the cones 36 move over the journal 4, the backing ring 28 approaches the fillet 6. Indeed, the large bore 74 at the end of the backing ring 28 fits snugly over the cylindrical surface 8, for the axially directed force is enough to overcome interference between the surface 8 and the bore 74, as well as the interference fit between the outboard seal ring 22 and journal 4 which develops at about the same time. After a short distance the contoured surface 68 of the backing ring 28 seats against the fillet 6, preventing further advance of the bearing assembly B. At this juncture, the end cap 10 is placed over the end of the outboard seal ring 22, its shallow counterbore 50 receiving the end of the seal ring 22. The bolts 12 are next inserted through the end of cap 8 and threaded into the end of the journal 4. When the bolts 12 are turned down inwardly against the end cap 10, they clamp the bearing assembly B tightly between the end cap 10 and the fillet 6.

In operation, the shaft A rotates relative to the cup 30 of the bearing 20 about the axis x, and the cup 30 fits within a containing structure such as a housing or chock. The cones 36 and spacer 44 of the bearing 20 of course, rotate with the shaft 1, as do the seal rings 22 and 24 and the backing ring 28. The shaft A not only carries a radially directed load, but a moment as well, and this moment imparts a cyclic flexure to the journal 4. The flexure is greatest within the inboard seal ring 24. Whereas fretting will occur between a conventional inboard wear ring and the journal 4, the seal ring 24, being separated from the journal 4, produces no fretting and therefore no groove develops beneath the ring 24 in the journal 4. Yet the seal ring 24 remains concentric with respect to the journal 4 so the inboard seal 26 which surrounds it runs true, its axis of rotation being the axis x. Moreover, the inboard seal ring 24 remains tightly clamped between the inboard cone 36 and the backing ring 28.

The shoulder 66 along the inner surface 64 of the inboard seal ring 24 provides a surface against which a tool may be located to strip the seal ring 24 from the backing ring 28. In the alternative, the shoulder 66 may be moved all the way into the backing ring 28, indeed to the very end of the seal ring 24 where it maY take the form of a chamfer.

The backing ring 28 may be modified to end at the large end of its contoured surface 68, and when so modified it does not have the large bore 74. The backing ring 28, as so configured, derives its concentricity solely from the fillet 6.

This invention is intended to cover all changes and modifications of the example of the invention herein chosen for purposes of the disclosure which do not constitute departures from the spirit and scope of the invention.

What is claimed is:

1. In combination with a shaft having a shoulder and a journal of smaller diameter projecting beyond the shoulder, an improved bearing assembly fitted to the journal to permit relative rotation between the shaft and another structure about an axis of rotation, said bearing assembly comprising: an antifriction bearing including an inner race located around the journal and having an outwardly presented raceway, an outer race having an inwardly presented raceway, and rolling elements located between and contacting the raceways of the inner and outer races; a backing ring located firmly against the shoulder such that it is incapable of moving radially with respect to the journal; a circular ring interposed between the inner race of the bearing and the backing ring, the circular ring being spaced radially outwardly from the journal and being captured radially by the backing ring so that it is centered with respect to the axis of rotation.

2. The combination according to claim 1 wherein the bearing assembly further comprises an annular seal interposed between the outer race of the bearing and the circular ring to form a barrier at the end of the bearing.

3. The combination according to claim 2 wherein the seal includes a rigid seal case that is connected with the outer race where it form a static barrier with the outer race and a flexible seal element which establishes a live barrier around the circular ring.

4. The combination accordingly to claim 3 wherein the seal further includes a shield which fits snugly around the circular ring and establishes a static barrier with the ring; and wherein the flexible seal element establishes the live seal barrier with the shield.

5. The combination according to claim 2 wherein the shoulder from which the journal projects is curved in the form of a fillet, and the backing ring has a contoured surface which matches the contour of the fillet and is against the fillet.

6. The combination according to claim 5 wherein the backing ring has an internal shoulder at the small end of its contoured surface and a small bore extending from the shoulder and opening out of the backing ring; and wherein the circular ring at its one end fits snugly into the small bore of the backing ring.

7. The combination according to claim 6 wherein an interference fit exists between circular ring and the surface of the small bore in the backing ring.

8. The combination according to claim 7 wherein the circular ring has a surface which is presented toward the backing ring and is exposed so that a tool may locate against it to apply a force to the circular ring for removing the circular ring from the backing ring.

9. The combination according to claim 6 wherein the backing ring at the large end of its contoured surface has a large bore that fits around the shaft beyond the fillet.

10. The combination according to claim 2 and further comprising means for clamping the inner race of the bearing, the circular ring and the backing ring together along the journal and for urging the backing ring snugly against the shoulder.

11. In combination with a shaft having a fillet near its end and a journal of lesser diameter projecting beyond the fillet, and also with an end cap which extends across the end of the journal and is held on the journal with screws that thread axially into the journal, an improved bearing assembly located around the journal between the fillet and end cap, so as to permit the shaft to rotate about an axis of rotation, said bearing assembly comprising: an antifriction bearing including outboard and inboard cones fitted around the journal with each having an outwardly presented tapered raceway, a cup located around the cones and having tapered raceways presented inwardly toward the raceways of the cones, and tapered rollers arranged in two rows between the raceways of the cones and cup; a backing ring located around the journal and against the fillet; an outboard seal ring located around the journal and between outboard cone and the end cap; and inboard seal ring located around the journal and between the inboard cone and the backing ring, the inboard seal ring being slightly larger than the journal so that a slight radial clearance exists between the inboard seal ring and the journal, the inboard seal ring being engaged with the backing ring such that the backing ring maintains the inboard seal ring centered with respect to the axis of rotation; and seal means fitted to the ends of the cup and cooperating with the seal rings for establishing barriers at the ends of the bearing.

12. The combination according to claim 11 wherein the backing ring has a bore which opens toward the bearing and receives the inboard seal ring.

13. The combination according to claim 12 wherein the backing ring has a shoulder at the end of the bore and the inboard seal ring at one end bears against the shoulder and at its opposite end bears against the inboard cone.

14. The combination according to claim 13 wherein an interference exists between the inboard seal ring and the cylindrical surface of the bore in the backing ring.

15. A bearing assembly for installation on a shaft journal, said bearing assembly comprising: an antifriction bearing including an inner race having a bore configured to receive the shaft journal such that the inner race fits tightly over a shaft journal and also having an outwardly presented raceway, an outer race located around the inner race and having an inwardly presented raceway, and rolling elements located between and contacting the raceways of the inner and outer races; a backing ring configured to fit against a shoulder at the end of the journal such that the backing ring is incapable of moving radially with respect to the inner race of the bearing; and a circular ring interposed between the inner race of the bearing and the backing ring, the circular ring having an inner surface of circular cross-section that is larger than the bore of the inner race, whereby the circular ring will be spaced radially outwardly from the journal, the circular ring being captured radially by the backing ring.

* * * * *